No. 763,506. PATENTED JUNE 28, 1904.
J. PETERSON.
CORN SHOCK OR HAY LOADING OR STACKING APPARATUS.
APPLICATION FILED JUNE 22, 1903.
NO MODEL. 3 SHEETS—SHEET 2.
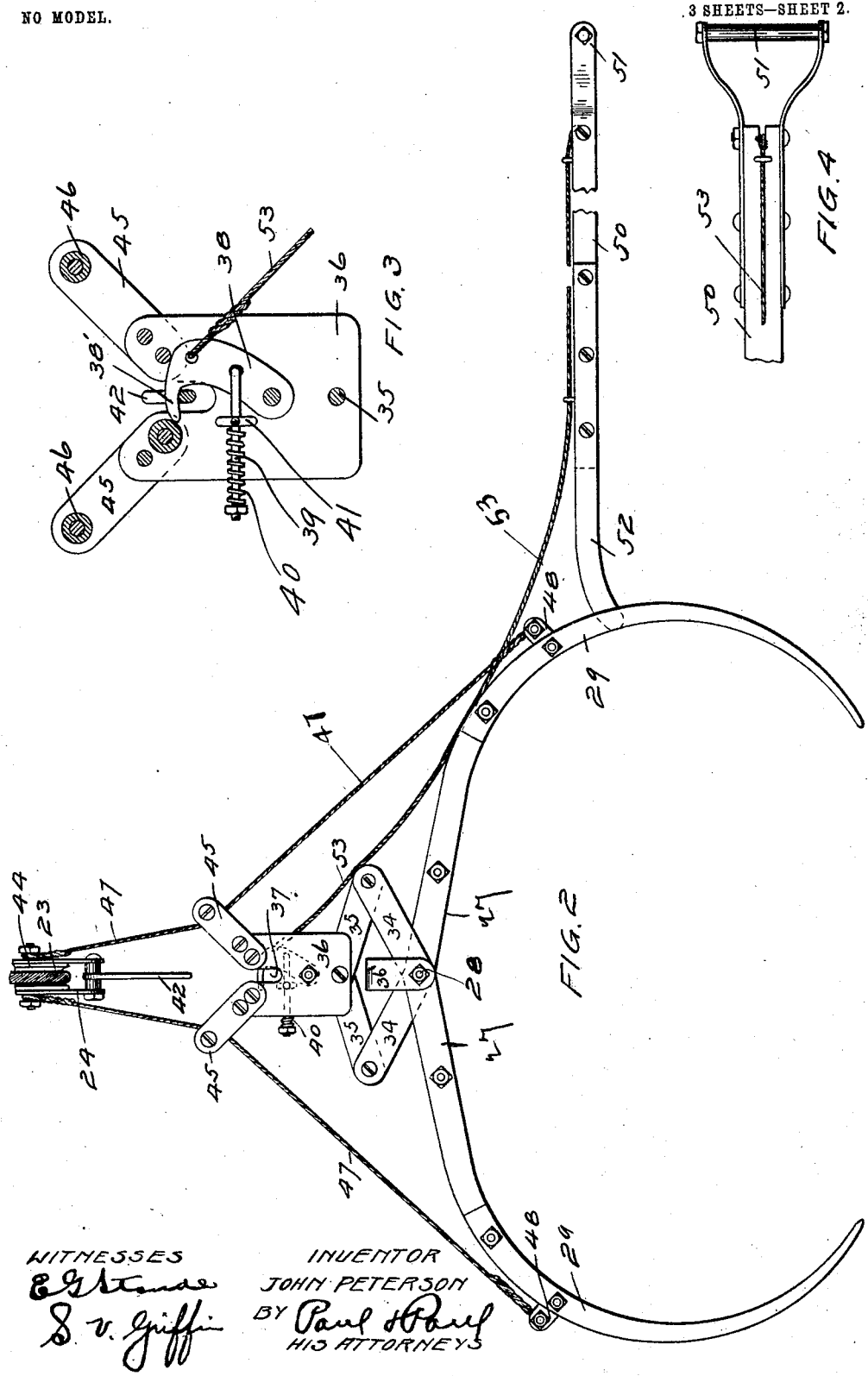
WITNESSES
INVENTOR
JOHN PETERSON
BY Paul & Paul
HIS ATTORNEYS

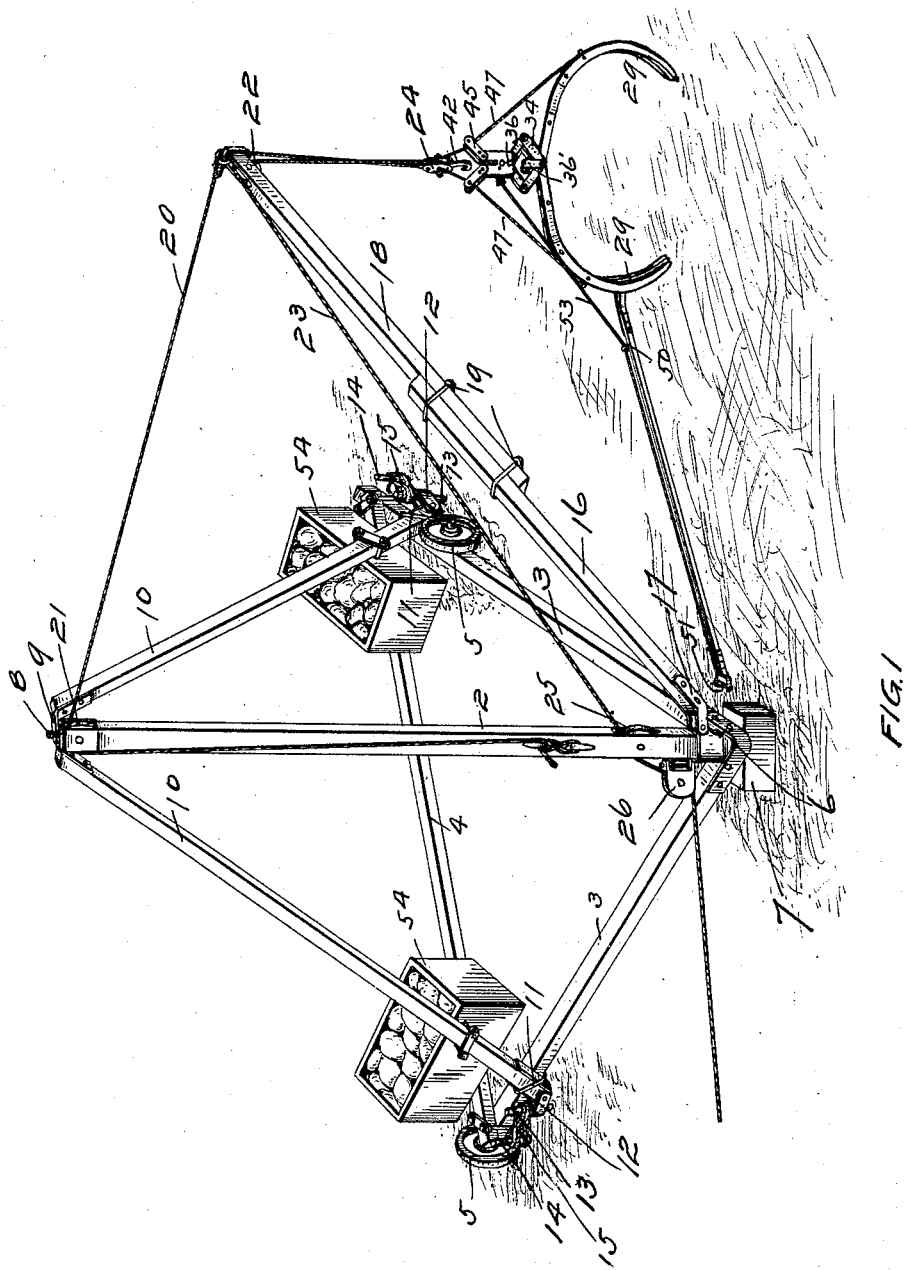

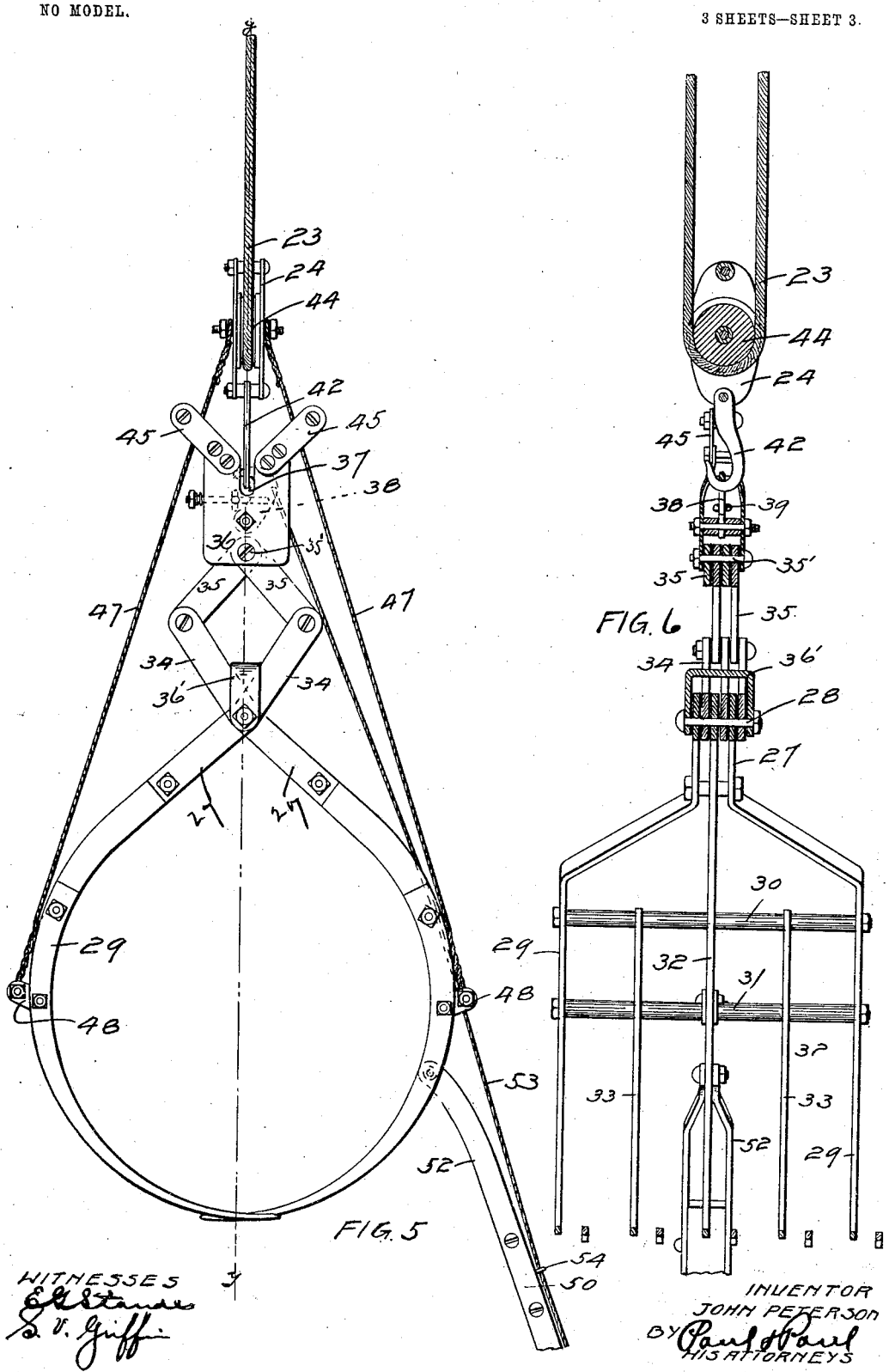

No. 763,506.

Patented June 28, 1904.

UNITED STATES PATENT OFFICE.

JOHN PETERSON, OF ST. PAUL, MINNESOTA.

CORN-SHOCK OR HAY LOADING OR STACKING APPARATUS.

SPECIFICATION forming part of Letters Patent No. 763,506, dated June 28, 1904.

Application filed June 22, 1903. Serial No. 162,513. (No model.)

*To all whom it may concern:*

Be it known that I, JOHN PETERSON, of St. Paul, in the county of Ramsey and State of Minnesota, have invented certain new and useful Improvements in Corn-Shock or Hay Loading or Stacking Apparatus, of which the following is a specification.

My invention relates to that class of farm machinery or appliances shown and described in Letters Patent of the United States, issued to me September 13, 1898, No. 610,609, and November 12, 1901, No. 686,532.

The object of my present invention is to provide an apparatus that can be drawn across the field with a wagon, if desired, and used for rapidly and conveniently picking up the bundles in a shock of corn or grain and depositing them on the wagon.

A further object is to provide an apparatus suitable for gathering up bunches of hay in the field and loading them on a wagon or in stacking hay, or the apparatus may be used for loading manure at a barn or moving timbers or stones from place to place.

A further and particular object is to provide a fork apparatus that is capable of picking up an extremely heavy load and having quickly-operating wide-opening jaws that will close quickly to grasp the load and as readily open to dump it.

The invention consists generally in various constructions and combinations, all as hereinafter described, and particularly pointed out in the claims.

In the accompanying drawings, forming part of this specification, Figure 1 is a perspective view showing the apparatus set up and ready for work. Fig. 2 is a side elevation of the lifting-forks in their open position. Fig. 3 is a detail showing the device for locking the forks against accidental opening. Fig. 4 is a detail of the handle device connected to the forks. Fig. 5 is a side elevation showing the forks closed, and Fig. 6 is a sectional view on the line *y y* of Fig. 5.

In the drawings, 2 represents an upright mast or standard corresponding to the one shown in my previous patents above referred to and supported at its lower end at the apex of a triangular horizontal frame composed of the side beams 3 and the base-beam 4. The side beams are supported on trucks 5 for convenience in moving the apparatus over a field, and the apex of the frame or the point of intersection of the side beams is provided with a strap 6, that is adapted to be attached to the rear end of a wagon. When in use in the field, it is not necessary to provide any means for supporting the apex of the triangular frame, as it will be connected with and supported by the wagon; but in using the apparatus near a haystack or in a barnyard I prefer to provide a block 7, supporting the apex of the triangular frame on substantially the same level as that of the base of the frame that is supported by the trucks.

The mast or standard 2 is provided with a pin 8 in its upper end, that is adapted to pass through straps 9, provided on the upper ends of bracing beams or legs 10, that are adapted to stay the mast and are secured at their lower ends to the side beams 3 by clamps 11. I prefer also to provide a clevis 12 at the lower end of each leg, and when the apparatus is stationary, as in a barnyard or near a stack, I provide anchor-posts 13, that are driven down through each clevis and are connected with similar anchor-posts 14 by ropes 15. These anchor-posts will hold the frame rigidly in place and prevent it from tilting— as, for instance, when a particularly heavy load is gathered up by the forks.

16 represents the inner section of the boom that is pivotally supported on the mast by means of a bracket 17. I prefer to provide an extension 18 on the outer end of said boom, secured thereto by clamps 19, which upon being loosened will allow the length of the boom to be increased or diminished at will, and hence increase or decrease its working radius. A rope 20 is connected to the outer end of the boom and passes over a pulley 21 at the top of the mast and is secured to the mast near the base of the same by the usual fastening device. By means of this rope the elevation of the outer end of the boom from the ground can be regulated at will according to the work to be performed. The outer end of the boom is provided with a pulley 22, and a rope 23 is connected to said boom and passes down through a block 24 and thence over the pulley 22 to a pulley 25 near the base of the mast and through the pulley-block 26 to a suitable source of power. Drawing on the rope 23 will raise the block 24, and slacking up on the said rope will allow the block 24 to drop.

27 27 represent side bars of the forks pivotally connected at a point intermediate to their ends by a bolt 28 and having inwardly-curved fingers or fork-tines 29, that are preferably integral continuations of the bars 27 27, but may be made independently thereof and secured thereto, if preferred. The tines 29 of each fork are connected by cross-rods 30 and 31, and intermediate to the ends of said rods a third curved middle tine 32 is provided, its inner end extending between the side bars and supported on the pivot-bolt 28. These three tines will form a fork suitable for handling corn or grain shocks or hay or timber; but for handling fine manure I prefer to provide intermediate shorter tines 33, mounted on the cross-rods 30 and 31 between the tines 29 and 32, and, if preferred, additional tines may be mounted on said cross-rods should it be desired to handle very fine manure or small articles that would slip between the tines of the ordinary fork, it being my purpose to regulate the number of tines in the fork according to the character of the work to be performed. The projecting ends 34 of the bars 27 27 are pivotally connected to links 35, that have a common pivot 35' in a trip-block 36. These links form a toggle-joint with the ends of the side bars, that is straightened when the forks are closed and broken when they are opened. A U-shaped member 36', pivoted on the bolt 28, prevents the ends 34 from swinging too near each other when the forks are being closed. The trip-block 36 is provided at its upper end with a slot 37, and a pivoted catch 38, having a hooked end 38', is mounted in said trip-block and adapted to swing back and forth, being normally held in position across said slot by means of a pin 39, that is slidable in a guide 41 in said trip-block, and between which guide and a nut on the opposite end of said pin a spring 40 is arranged. A depending hook 42 is provided on the trip-block 24, and a pulley 44 is mounted in said block, around which the rope 23 passes. The upper end of the trip-block 36 is provided with diverging arms 45, having antifriction-rollers 46, and ropes 47 connect the block 24 with lugs 48, provided on the tines 29 of each fork at a point near the middle of the same. When the locking-catch 38 is operated by rope 53 and the hook 42 released and the block 24 raised, the fork-jaws will be quickly swung open to drop the load.

50 represents a beam or operating-handle provided at one end with a hand-grip 51 and at its opposite end with straps 52, that are pivotally connected to the middle tine of one fork. A cord 53 passes through eyelets 54, provided on said operating-handle, and is connected at one end to the locking-catch 38. The other end of the cord is in convenient reach of the operator, who can by drawing on the same disengage the catch 38 from the hook 42 and allow the forks to open and deposit their load.

The operation of my apparatus is as follows: Assuming that the machine is being drawn across a field, the operator will adjust the boom the desired height from the ground and then by means of the operating-handle swing the forks around to the desired position to gather up the hay, bundles of corn or grain, or other articles. The forks will be opened by the act of raising them above the work, their weight on the cords 47 causing them to swing automatically away from each other, their proper adjustment over the load being readily obtained by means of the operating-handle. The rope 23 is then allowed to become slack, and the forks will drop down over the load, and the hook 42 is inserted into the slot in the top of the trip-block 36 and engaged with the catch 38. The toggle-joint will be broken by the separation of the forks; but as soon as the hook 42 engages the catch and power is applied the forks will automatically close, and the ends of the opposite tines will pass one another and grip the bundles of corn, grain, or hay and lift them from the ground. As soon as the forks and their load have been lifted the operator by means of the handle can swing the forks and boom to the desired dumping spot and when properly located can by drawing on the rope 53 disengage the catch 38 from the hook 42, whereupon the weight of the forks and their load will be thrown upon the ropes 47, which will immediately draw the curved tines of the forks apart and allow the load to drop down between them.

In using the apparatus around a haystack or barn I prefer to provide boxes 54, mounted on the rear beam 4 of the frame and adapted to contain stones or other suitable weights that will aid in holding the frame in place and act as a counterbalance for the boom and the weight of the forks and their load. I am aware that coöperating lifting-forks in a broad sense are old in this art, and I therefore in this application lay particular claim to the structure of the fork and the means employed for effecting the rapid opening and closing of the same.

I claim as my invention—

1. A lifting-fork, comprising side and intermediate bars pivotally connected near one end and inwardly curved at their opposite ends to form the fork-tines, cross-rods connecting said bars, curved shorter tines mounted on said rods, a trip-block, a spring-pressed latch carried thereby, links pivotally connecting said trip-block and the ends of said bars near their pivot, a pulley-block having a hook adapted to engage said latch, flexible connections provided between said pulley-block and said bars, and means for tripping said latch.

2. A lifting-fork comprising side bars having inwardly-curved tines or fingers, an intermediate bar also inwardly curved at one end and extending between said bars at its other end, cross-bars connecting said side and intermediate bars, curved fingers or tines carried by said short bars, a bolt passing through said side and intermediate bars of each fork and pivotally connecting them together at a point intermediate to their ends, a spring-catch, a trip-block wherein said catch is mounted, links pivotally connecting said trip-block and the ends of said bars near their pivotal connection, a pulley-block having a hook adapted to be engaged by said catch, flexible connections provided between said pulley-block and said forks near the middle thereof, a suitable operating-handle for said fork, and a cord connected with said spring-catch and with said handle, substantially as described.

3. In a device of the class described, the combination, with forks having inwardly-turned tines at one end and pivotally connected near their opposite end, of a trip-frame having a vertical slot in its upper end, links pivotally connecting the lower end of said frame with the ends of said forks near their connecting-pivot, a latch pivoted in said frame, a spring device for normally holding said latch across said slot, a pulley-block having a hook arranged to enter said slot and be engaged and locked therein by said latch, flexible connections provided between said pulley-block and said forks, a handle pivotally supported on one of said forks and a cord leading from said handle to said pivoted latch, substantially as described.

4. In a device of the class described, the combination, with a series of bars inwardly turned at one end to form coöperating tines and pivotally connected near their opposite ends, a U-shaped member mounted on the pivot of said bars and arranged to limit the movement of their tines toward each other, a trip-frame, links pivotally connecting the lower end of said trip-frame and the ends of said bars, a pulley-block having a hook adapted to enter a slot provided in the upper end of said trip-frame, cords connecting said pulley-blocks and said tines at points intermediate to their ends, a latch pivotally supported in said trip-frame and arranged to engage said hook and normally lock it in said slot and a cord connected with said latch for tripping the same to release said hook.

In witness whereof I have hereunto set my hand this 17th day of June, 1903.

JOHN PETERSON.

In presence of—
  RICHARD PAUL,
  S. V. GRIFFIN.